Aug. 12, 1969     J. DROUARD     3,461,328

EXTERNALLY PRISMATIC SHAPED ELECTROMAGNETIC ROTARY MACHINE

Filed June 5, 1967     5 Sheets-Sheet 1

Aug. 12, 1969  J. DROUARD  3,461,328
EXTERNALLY PRISMATIC SHAPED ELECTROMAGNETIC ROTARY MACHINE
Filed June 5, 1967  5 Sheets-Sheet 4

United States Patent Office 3,461,328
Patented Aug. 12, 1969

3,461,328
EXTERNALLY PRISMATIC SHAPED ELECTROMAGNETIC ROTARY MACHINE
Jean Drouard, Paris, France, assignor to Moteurs Drouard, Paris, France, a French body corporate
Filed June 5, 1967, Ser. No. 643,435
Claims priority, application France, June 7, 1966, 64,432
Int. Cl. H02k 9/28
U.S. Cl. 310—52                        13 Claims

ABSTRACT OF THE DISCLOSURE

An electromagnetic rotary machine such as an electric motor or generator comprising an assembly of magnetic laminations constituting a stator maintained at both ends by end collars and outer hollow stays interconnecting the collars and constituting ventilating passages, the collars having a U-shaped radial section defining a cavity which faces inwardly of the machine.

---

The present invention relates to constructional improvements in electromagnetic rotary machines, this expression designating electric motors or generators. The invention relates to devices promoting the cooling of enclosed machines and the adaptation of the machine to the mechanical unit to which it must be connected.

It is known that the cooling of electric machines can be improved by cutting fins on the periphery of each magnetic lamination and assembling these laminations in such manner as to produce a magnetic circuit which has cooling fins throughout the length thereof. The outer surface thus obtained is much greater than that which would correspond to the lateral cylindrical surface of the same magnetic circuit devoid of fins.

In order to achieve maximum efficiency for this arrangement, it is necessary to multiply the number of fins of each lamination. This condition implies the provision of narrow fins and the thin fins thus obtained can be numerous but are fragile.

It is also known to construct electromagnetic rotary machines having in particular a stator whose assembly of magnetic laminations is maintained between two lateral collars or rings which are located respectively at the two ends of the assembly and interconnected by hollow outer stays which constitute ventilating passageways.

When it concerns machines which must having a fixing base the latter consists of lugs which are connected to the stays for example by welding.

The height of the axis of the machine is therefore a function of the height of the lugs. The latter must have, moreover, cavities adapted to form a passage for the air from the fan which cools the stator.

Now, the heights of the axis of electric motors are now standardized. Further, those of machines which must be driven by these motors must correspond to recommended dimensions. In tables showing the latter dimensions are to be found among the ranges or series of the proposed dimensions, the axis heights of the motors.

Despite this fact, it often occurs that the respective heights of the axes of the motor and machine differ to the extent of one range or series. In this case, the direct coupling can only be achieved by means of packing blocks or by modifying the height of the axis of one of the machines. As concerns the motor, a complete re-arrangement is necessary, which results in considerable and costly modifications in the models or shells in the case of cast steel, iron or aluminium frames or in the tooling for equipment constructed of pressed and welded steel.

The object of the present invention is to avoid fragile cooling fins and very easily remedy the drawback resulting from differences in the axis heights.

The invention provides an electromagnetic rotary machine motor or generator of the aforementioned general type. In this machine, said collars have the shape of U-section collars the cavity of which faces inwardly of the machine. Each of the stays can comprise two outer adjacent sides, their arrangement being such that two of any neighbouring sides pertaining to two consecutive stays are in the same plane, the stays defining in this way substantially a prismatic surface having a regular section one side of which serves as a base for the motor.

The heads of the windings of the stator can be embedded in masses of material which is a good conductor of heat, these masses constituting a homogeneous solid ring inside each of the collars.

With this arrangement, no obstacle pertaining to the lugs or the stand is inserted in the ventilating circuit. The stays substantially define a prismatic volume each side of which can serve as a base plane for the machine. As these planes can be by construction respectively more or less close to the axis of the machine, the latter can be used for different axis heights.

According to a preferred embodiment of the invention, each of the stays consists of a strip of sheet metal folded along longitudinal fold lines the edges of these stays carrying, and being welded to, said collars surrounding the assembly of stator plates and to the exterior of said assembly of plates.

This arrangement imparts rigidity to the assembly and provides a passage for the flux of heat given off in the motor.

When four stays are employed, each of them defines a cavity whose section has a general shape of a right-angled triangle whose side opposite the right angle is formed by the curved outer face of the magnetic circuit. This curvilinear triangle corresponds to the cross section of the ventilating passageway constituted by each of the stays for cooling the machine.

As mentioned hereinbefore, solely the air from the fan could flow through these cavities. They can also be divided into two compartments by a partition wall which is substantially parallel to the outer cylindrical face of the magnetic circuit of the motor. The compartment located between the median partition wall and the magnetic circuit serves, as before, for the passage of the air from the fan, and other compartment, defined by the partition wall and the right angle, communicating by way of two pipes with the interior of the machine.

According to a preferred embodiment of the invention, each lamination of the stator can exceed the outside diameter of said collars and comprise teeth, the assembly or stacking of which forms the ventilating fins. These fins, even when numerous and thin, are completely protected by the very shape of the stay shielding them.

Another object of the invention is to provide a method for forming said solid homogeneous masses inside the stator, said method comprising, following on the assembly of said laminations with said collars and the provision of the stator winding, introducing in each end of the stator a mandrel defining with the stator and the corresponding collar a circular inner space encompassing the heads of the windings, injecting in said space a material which is brought to the liquid or viscous state, if need be by heating, said material, once solidified, being a good conductor of heat, and centrifugating said liquid or viscous mass by rotating the mass at high speed about the axis of the machine until said mass is solidified by cooling.

Further features and advantages of the invention will be apparent from the ensuing description with reference to the accompanying drawings.

Figure 1:
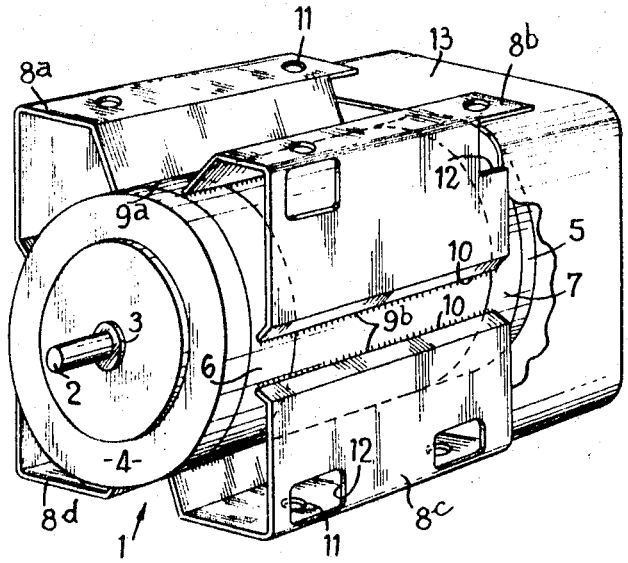
FIG. 1 is a perspective view of a machine according to the invention comprising four stays forming a prism having a rectangular section.
Figure 2:
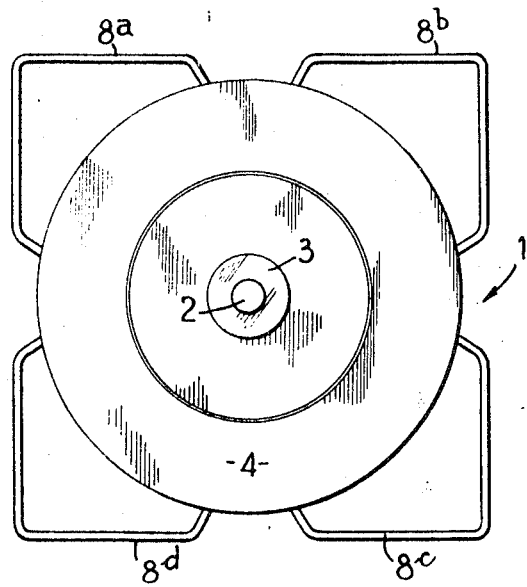
FIG. 2 is an end elevational view of the machine shown in FIG. 1.
Figure 3:
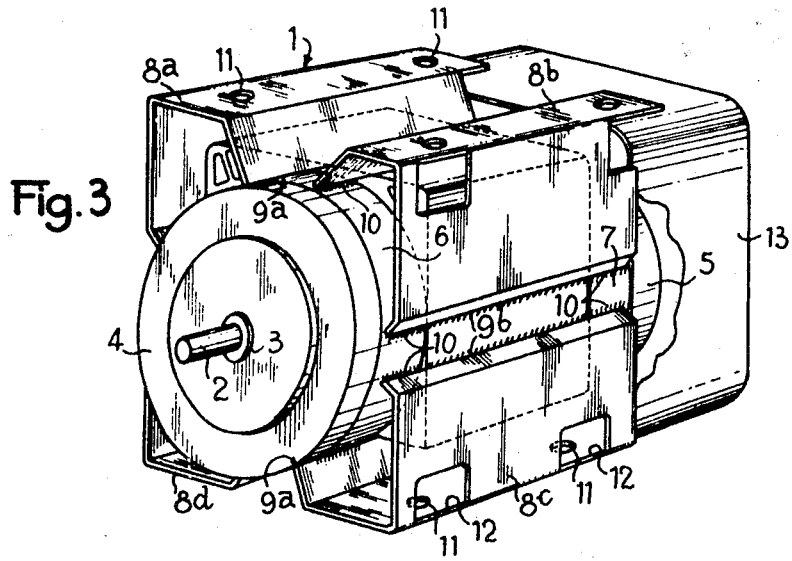
FIG. 3 is a view similar to FIG. 1 showing more particularly the improved cooling means according to the invention.
Figure 4:
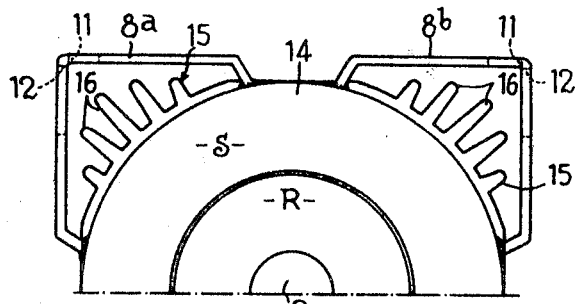
FIGS. 4 and 5 are partial axial sectional views of an improved machine according to the invention showing the perfect protection of the cooling fins by the folded sheets constituting the stays.
Figure 5:
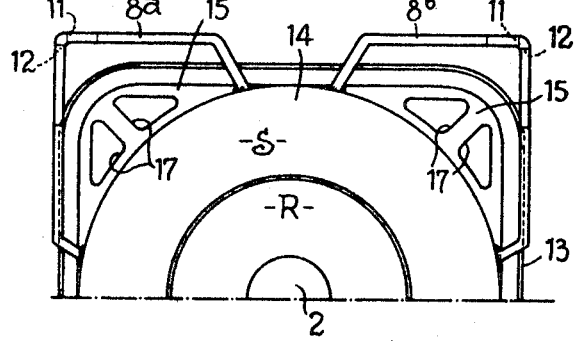
Figure 6:
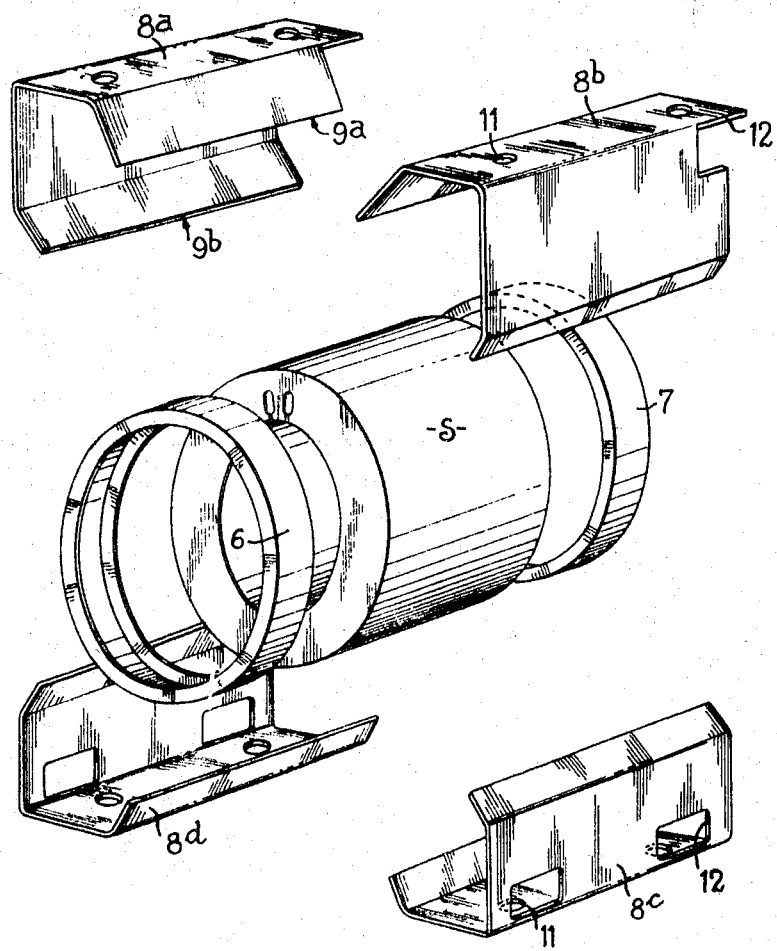
FIG. 6 is an exploded view of the stator of the machine shown in FIG. 1.
Figure 7:
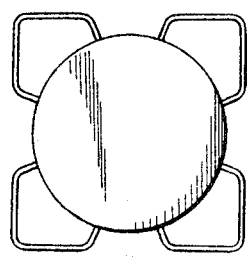
FIGS. 7–11 show the various shapes which might be given to the motors constructed in accordance with the invention.
Figure 8:
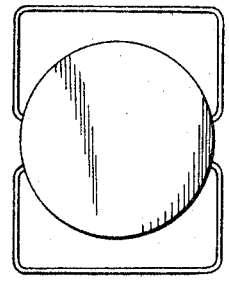
Figure 9:
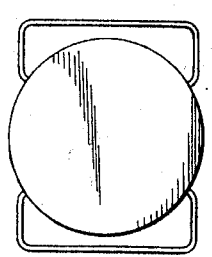
Figure 10:
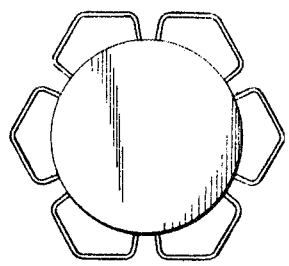

In the embodiment shown in FIGS. 1–6, the machine 1 according to the invention comprises a shaft 2 on which a rotor R is mounted. This shaft is supported by bearings 13 mounted in end walls 4, 5 which are fitted on two collars 6, 7 (FIGS. 1, 3 and 6). These collars 6 and 7 are rendered integral with each other by four stays $8^a$, $8^b$, $8^c$ and $8^d$ whose outer edges $9^a$, $9^b$ are welded at 10 to these collars and to the entire length of the assembly of the laminations of the stator.

The stays have a generally L-shape and their flanges are at right angles to each other and can have equal or unequal lengths, the free edges of the these flanges being slightly chamfered towards the interior of the stay so as to form the edges $9^a$, $9^b$. The assembly of these four stays $8^a$–$8^d$ is such that the exterior of the machine has a generally square or rectangular four-side shape, depending on the shape of the stays.

Each stay can comprise apertures 11 for fixing the machine to a base (not shown). Openings 12 are provided to allow easy access, for exampe with a spanner, to bolts introduced in the apertures 11.

In FIGS. 1 and 3, the apertures 11 permit the fixing of the machine on a base in two positions. It is possible of course to provide other apertures on the other sides of the four-sided structure either to provide another fixing position or for attaching housings of control equipment or even fixing another machine.

A cap 13 is provided on the rear end of the machine.

As can be seen better in FIGS. 4 and 5, the lamination assembly 14 of the stator S can have one or a plurality of projecting parts 15 which extend beyond the periphery of the collars 6 and 7. According to the embodiment shown in FIG. 3, each lamination of the assembly 14 is provided with radial extensions 16 which form, when the laminations are assembled, a plurality of radial fins.

The air from the fan—which is driven either by the machine itself or by other appropriate means—can circulate in the passageways defined by the stays $8^a$, $8^b$, $8^c$ and $8^d$ and said fins.

FIG. 5 illustrates a modification of this cooling system. In this case, the stator laminations have a generally rectangular shape with rounded corners. Provided in the parts extending beyond the periphery of the collars 6 and 7, are openings 17 which also form, after assembly of the stator laminations, ventilation passageways.

The projecting portions 15 can be connected to the stator laminations by welding or formed by apertures in the corners of the magnetic lamination itself.

This arrangement of the magnetic lamination assembly of the stator extending into the space formed by the stays $8^a$, $8^b$, $8^c$ and $8^d$ results in a very efficient cooling of the laminations and of the heads of the windings.

FIGS. 7–10 represent various embodiments of the invention. The motors are shown in end elevation and have a regular cross-sectional shape one side serving as a base. This side can be chosen at will with no need to modify the construction of the machine. In particular, it will be observed that the motors shown in FIGS. 8 and 9 afford different shaft heights.

Figure 11:
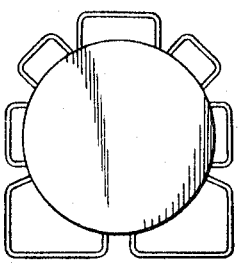

FIG. 11 shows a motor only the base of which is formed by two L-shaped elements of the type shown in FIGS. 1 and 2.

Figure 12:
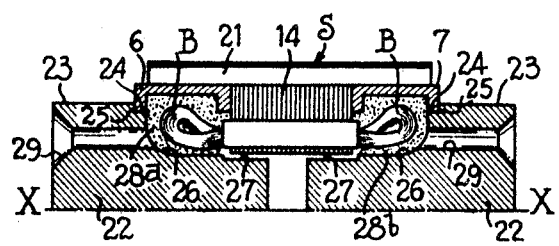
FIG. 12 is a partial sectional view of a stator in one stage of the method according to the invention.

FIG. 12 shows a stage in the method for manufacturing the machine according to the invention and more particularly concerns the formation of rings which are constructed from a material which is a good conductor of heat and effectively cool the heads of the stator windings.

The stator S shown in FIG. 12 comprises an assembly 14 of stator laminations united by two U-section collars 6 and 7 rendered integral by stays 21 which can be similar to the stays $8^a$–$8^d$. This stator is supported by two mandrels or supports 22 having a generally conical cross-sectional shape respectively inserted in the ends of the stator S. These mandrels can be driven by means (not shown) about an axis of rotation X—X which coincides with the axis of the machine.

Each mandrel 22 comprises a cylindrical portion 23, an intermediate cylindrical portion 24 forming a shoulder 25 which acts as an abutment when inserting the mandrels 22 in the stator S.

The median portion of each mandrel is provided with a face 26 whose radial section is curved. These mandrels comprise a cylindrical end portion 27 having a diameter equal to the inside diameter of the assembly 14.

These mandrels therefore define with the stator S and the collars 6, 7 two annular cavities $28^a$, $28^b$ which communicate with the exterior by way of apertures 29. These apertures are provided for the introduction of a material which is a good conductor of heat. This material can be liquid, viscous or even pasty but must solidify subsequent to the introduction thereof in the annular cavities.

In order to constitute if necessary the coating of the heads of the windings B, the following procedure is adopted. After assembly of the stator assembly 14, the collars 6 and 7 interconnected by the stays 21 and stator windings B, the two mandrels 22 are inserted in the stator until the shoulders 25 abut the outer radial faces of the collars 6 and 7 respectively. The annular cavities $28^a$, $28^b$ are then filled with a sufficient amount of the material which is a good conductor of heat. The assembly is then subjected to rotary motion or centrifugation about the axis X—X and this homogenizes the fluid mass and expels the inclusions of air bubbles or blisters which are bad conductors of heat so that the mass adheres perfectly to the inner faces of the cavities $28^a$, $28^b$. The filling material solidifies in the course of this operation.

The heads of the windings are thus covered and a good conduction of the heat produced in these heads in the course of operation of the machine is ensured. This heat is dissipated by way of the outer face of the rings 6, 7 over which the cooling air for the machine flows.

Figure 13:
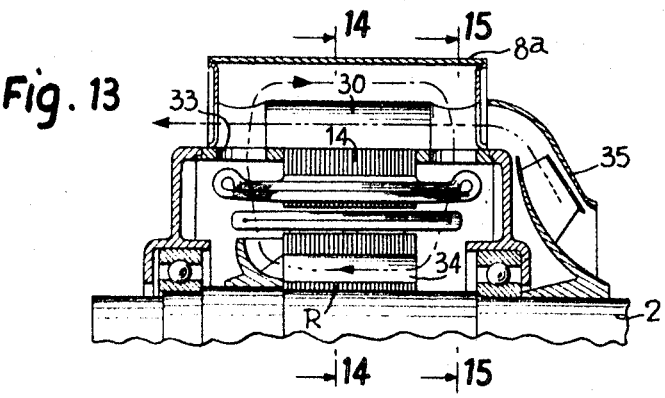
FIG. 13 is a partial sectional view of a motor comprising a cooling circuit for cooling the rotor.
Figure 14:
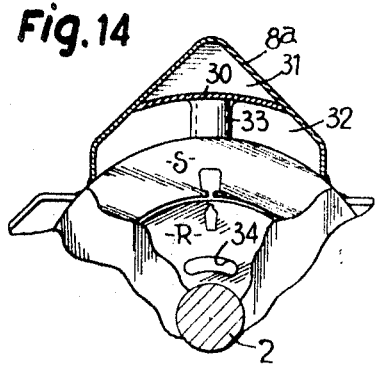
FIG. 14 is a sectional view taken along line 14—14 of FIG. 13.
Figure 15:
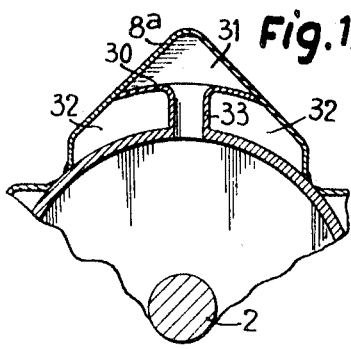
FIG. 15 is a sectional view taken along line 15—15 of FIG. 13.

FIGS. 13 and 15 show an embodiment in which both the stator and the rotor of the motor are cooled. In this case, the stays $8^a$, $8^b$, $8^c$ and $8^d$ are provided with an inner wall 30 defining two compartments 31 and 32. The outer compartment communicates with the interior of the motor by way of passageways 33 which extend across the inner compartment 32 and are disposed in the vicinity of each end of the assembly 14. Further, the rotor R of this motor comprises longitudinal passageways 34 affording an inner cooling circuit. The inner compartment 32 communicates with the ventilating pipe 35 and with the exterior of the motor. It can therefore be seen that the rotor is cooled by the circulation of air in a closed circuit and that this current of air circulates in a direction opposed to that of the main current of air produced by the fan for cooling the outer wall of the same stator S.

Figure 16:
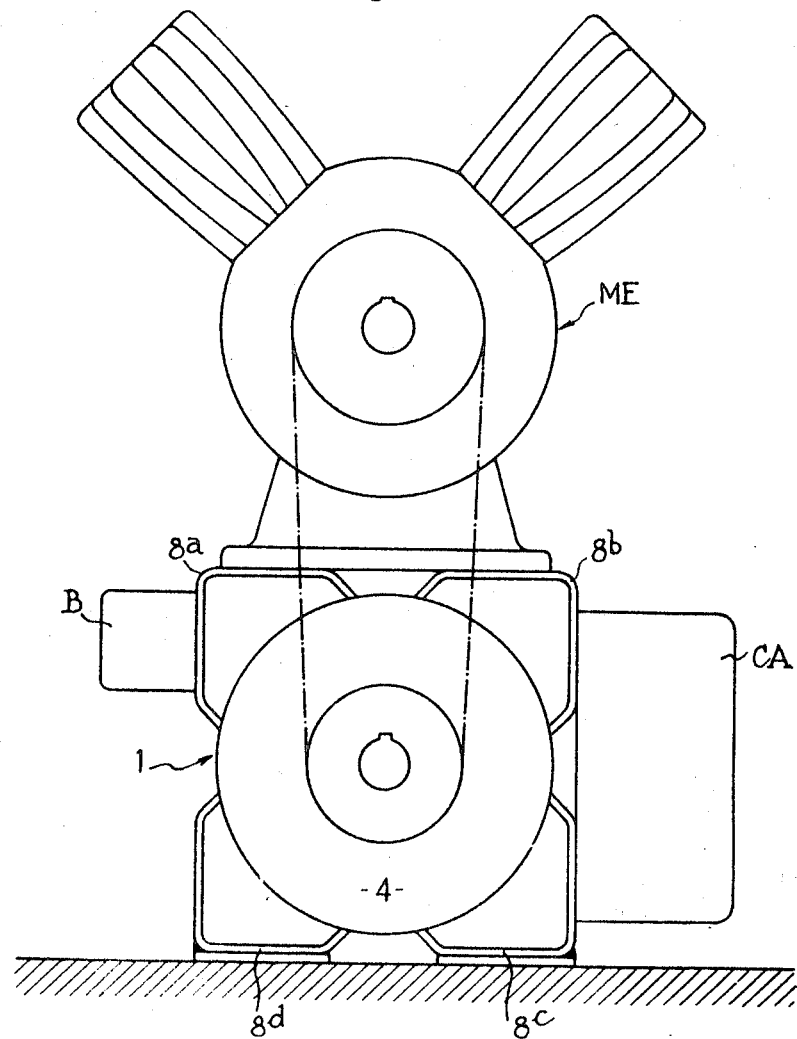
FIG. 16 is an end elevational view of one application of the invention.

FIG. 16 shows by way of illustration a motor 1 according to the invention coupled to a driven machine ME by means of a pair of pulleys P and a belt C. The electric machine 1 is provided with an equipement case CA and a terminal box B. It can be seen that it is easy to mount the driven machine ME on the upper face of the motor 1.

Although specific embodiments of the invention have been described, many modifications and changes may be made therein without departing from the scope of the invention as defined in the appended claims.

Having now described my invention what I claim as new and desire to secure by Letters Patent is:

1. An electromagnetic rotary machine such as an electric motor or generator comprising an assembly of magnetic laminations constituting a stator, two end collars located respectively at the two ends of said assembly and maintaining said assembly, outer hollow stays constituting ventilating passages interconnecting said collars, said collars having a U-shaped radial section defining a cavity which faces inwardly of the machine and wherein each of said stays comprises two adjacent outer sides, their arrangement being such that any two neighbouring sides pertaining to two consecutive stays are in the same plane, the stays thus defining substantially a prismatic surface having a regular cross-sectional shape one side of which serves as a base for the machine.

2. A machine as claimed in claim 1, wherein the stator includes windings having heads, said machine further comprising masses of a material which is a good conductor of heat in which said heads are embedded, said masses forming a solid homogeneous ring inside each of the collars.

3. A machine as claimed in claim 1, comprising four of said stays, said regular cross-sectional shape being square.

4. A machine as claimed in claim 1, comprising four of said stays, said regular cross-sectional shape being rectangular.

5. A machine as claimed in claim 1, comprising two of said stays.

6. A machine as claimed in claim 1, comprising six of said stays, said regular cross-sectional shape being hexagonal.

7. A machine as claimed in claim 1, wherein each of said stays consists of a strip of metal having a generally L-sectional shape and flanges.

8. A machine as claimed in claim 7, wherein said flanges are equal.

9. A machine as claimed in claim 7, wherein said flanges are unequal.

10. A machine as claimed in claim 1, wherein each of said stays consists of a strip having flanges extending longitudinally of said machine, said flanges having longitudinally extending edges welded to said collars and to said assembly of laminations.

11. A machine as claimed in claim 7, wherein a marginal portion of each of said flanges makes an angle with the flange throughout the length of said stay.

12. A machine as claimed in claim 1, wherein each of said stays comprises an aperture for fixing the stay to a base by fixing members, whereby said stays also perform the function of machine fixing feet or a base face for receiving equipment housings or other machines.

13. A machine as claimed in claim 1, wherein each of said stays comprises a longitudinally extending wall defining two compartments in the hollow of the stay, one of which communicates with the interior of the machine so as to form a closed cooling circuit whereas the other constitutes a part of a cooling circuit for said assembly of laminations, said wall constituting a wall for exchanging heat between the currents of air flowing in the two compartments.

References Cited

UNITED STATES PATENTS 3,250,926    5/1966    O'Reilly _____ 310—60

FOREIGN PATENTS 457,958    6/1950    Italy.

WARREN E. RAY, Primary Examiner

R. SKUDY, Assistant Examiner

U.S. Cl. X.R.

310—59